United States Patent [19]

Bastian et al.

[11] Patent Number: 5,405,657
[45] Date of Patent: Apr. 11, 1995

[54] PROCESS FOR THE PRODUCTION OF FLEXIBLE PROTECTIVE, AUXILIARY AND INSULATING MATERIALS ON A FIBRE BASIS FOR ELECTRICAL PURPOSES, USING IMPREGNATING MASSAS WHICH ARE CURABLE BY HIGH ENERGY RADIATION

[75] Inventors: Udo Bastian, Ratingen; Rainer Krause, Wuppertal; Gerhard Kiessling, Hattingen, all of Germany

[73] Assignee: Herberts G.m.b.H., Wuppertal, Germany

[21] Appl. No.: 146,777

[22] Filed: Nov. 2, 1993

Related U.S. Application Data

[63] Continuation of Ser. No. 850,086, Mar. 12, 1992, abandoned.

[51] Int. Cl.⁶ ............................................. B05D 3/00
[52] U.S. Cl. ................................. 427/501; 525/165; 525/166; 525/168; 525/172; 525/178; 525/437; 525/444; 525/445; 525/447; 525/448; 428/480; 428/482; 522/6; 522/104; 522/107; 427/118; 427/121; 427/487; 427/496; 427/498; 427/500; 427/505; 427/507

[58] Field of Search ............... 525/165, 166, 168, 172, 525/178, 437, 444, 445, 447, 448; 428/480, 482; 522/6, 104, 107; 427/487, 496, 498, 500, 501, 505, 507, 118, 121

[56] References Cited

U.S. PATENT DOCUMENTS

| | | | |
|---|---|---|---|
| 3,929,490 | 12/1975 | Reiter et al. | 430/281 |
| 4,017,652 | 4/1977 | Gruber | 427/54.1 |
| 4,089,815 | 5/1978 | Reiter et al. | 525/333.4 |
| 4,318,791 | 3/1982 | Felder et al. | 522/33 |
| 4,347,111 | 8/1982 | Gehlhaus et al. | 522/8 |
| 4,485,123 | 11/1984 | Troue | 427/54.1 |
| 4,602,097 | 7/1986 | Curtis | 549/27 |

*Primary Examiner*—Samuel A. Acquah
*Attorney, Agent, or Firm*—Richard A. Speer; Keck, Mahin & Cate

[57] ABSTRACT

A process for the production of flexible impregnated protective, auxiliary and insulating materials on a fibre basis for electrical purposes by the application of an impregnating agent to the material to be impregnated, followed by curing, characterised in that a solvent-free impregnating mass containing one or more olefinically unsaturated, radically polymerisable polyesters, which contain one or more radically polymerisable monomers as reactive diluents, one or more plasticizing agents and optionally one or more peroxide-free radical initiators is applied to the material to be impregnated and curing is then carried out with high energy radiation and optionally by further heating.

28 Claims, No Drawings

PROCESS FOR THE PRODUCTION OF FLEXIBLE PROTECTIVE, AUXILIARY AND INSULATING MATERIALS ON A FIBRE BASIS FOR ELECTRICAL PURPOSES, USING IMPREGNATING MASSAS WHICH ARE CURABLE BY HIGH ENERGY RADIATION

This is a continuation of application Ser. No. 07/850,086 filed on Mar. 12, 1992 now abandoned, the text of which is hereby incorporated by reference.

This invention relates to the field Of production of impregnated flexible protective, auxiliary and insulating materials on a fibre basis for electrical purposes, in particular for the production of tubes of fabric and of electric surrounded by fabric.

Various fibre materials are used for insulating purposes in electrotechnology, such as spiral coverings, spun yarn, braided yarn and woven fabric, for example of fibreglass, cotton or synthetic resins such as polyesters. For this purpose, tubes of fabric of differing diameters, for example, may be produced through which the electric or optical conductors may subsequently be passed or strands of wire may be directly covered with fabrics to form so-called fabric litz wires. For insulating purposes and protection against the influences of moisture and chemicals such fabrics are coated on the outside with coating compounds and subsequently cured. In practice, for example, the fabrics may be impregnated with solvent-containing lacquers based on polyurethane. When such impregnating masses are cured by heat, emissions occur which not only give rise to environmental problems such as unpleasant odours and problems of toxicity but also cause loss of material.

In accordance with DE-A-27 06 639 prepregs are prepared from fibre materials and liquid epoxy resins which request the use of toxic epoxides and which are rigid and have a low thermal stability. EP-A-O 023 634 describes rigid molded bodies which are prepared by thermal precuring and final curing with UV-radiation of polyester resins between two films.

During the thermal precuring undesired emissions occur. In accordance with AT-PS-309 087 prepregs are prepared from glass fibre materials impregnated with solvent containing systems which are cured to form rigid materials after curing, There is the risk of solvent emissions.

It was an object of this invention to provide a process for the production of flexible impregnated protective, auxiliary and isolating materials on a fibre basis for electrical purposes such as conductors by the application of a coating, followed by curing, in such a manner as to prevent emissions.

This problem can be solved by a process for the production of flexible impregnated protective, auxiliary and insulating materials on a fibre basis for electrical purposes by the application of an impregnating agent to the material to be impregnated, followed by curing, characterised in that a solvent-free impregnating mass containing one or more olefinically unsaturated, radically polymerisable polyesters, which contain one or more radically polymerisable monomers as reactive diluents, one or more plasticizing agents and optionally one or more peroxide-free radical initiators is applied to the material to be impregnated and curing is then carried out with high energy radiation and optionally by further heating.

The impregnating mass may contain one or more peroxide-free radical initiators. If curing is to be carried out by high energy radiation such as, for example, UV radiation, it is advantageous to add a suitable photoinitiator to the impregnating mass. Such photoinitiators are unnecessary when, for example, curing is carried out by means of electron radiation but photoinitiators may be used even in that case. If after-curing is to be carried out by heating after an initial curing with high energy radiation, it is advisable to add radical initiators which respond to heat.

The process according to the invention is carried out solvent-free using one or more olefinically unsaturated radically polymerisable polyesters, as binders. Olefinically unsaturated polymer resins which are common on the field of coating agents can be used as such polyesters. The can also contain imide groups.

Polyester resins of this type are described, for example, in EP-A-O 134 513. These unsaturated polyesters may be, for example, condensation products of polybasic, unsaturated carboxylic acids, polyhydric alcohols and, if they are imide-containing, compounds containing amino groups, optionally with a proportion of monofunctional compounds. Examples of polybasic carboxylic acids are: Dicarboxylic acids such as maleic or fumaric acid, citraconic acid, itaconic acid optionally mixed with saturated or aromatic carboxylic acids such as succinic or adipic acid, phthalic acid, isophthalic acid, terephthalic acid and the like as well as tetrahydrophthalic acid, endomethylene tetrahydrophthalic acid and the corresponding partially or completely halogenated compounds (which have flame-retarding properties). The acids may be used in the form of their derivatives, such as esters, semi-esters or anhydrides. Examples of compounds containing differing functional groups which can also be used are: Citric acid monoethanolamine, aminoethanecarboxylic acid and the corresponding amino alcohols or aminocarboxylic acids containing 3 or 4 $CH_2$ groups.

Examples for polyhydric alcohols for the preparation of polyesters are generally the compounds conventionally used in the art for the preparation of polyesters. Examples of suitable diols include glycol, neopentyl glycol and propylene glycol. Examples of polyols having 3 or 4 hydroxyl groups include glycerol, trimethylolpropane, trimethylolethane, pentaerythritol, dipentaerythritol and tris-ethylisocyanate.

It is particularly suitable to use unsaturated polyesters which are so-called imide-containing unsaturated polyesters as described, for example, in DE-A-15 70 273, 17 70 386 and 28 56 050 and in EP-A-0 134 513. Such imide-containing unsaturated polyesters may be prepared by, for example, the incorporation by condensation of polycarboxylic acids which have amino groups capable of anhydride formation and imide formation and form an imide ring with amino groups. For example, tetrahydrophthalic acid or its anhydride which forms a 5-membered amide ring with amino groups may be incorporated by condensation in the preparation of the above mentioned unsaturated polyesters. The imide-containing, olefinically unsaturated polyesters may be prepared, for example, according to DE-A-28 56 050 by the reaction of imide group-containing compounds corresponding to the following general formula

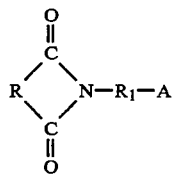

wherein R stands for an aromatic, cycloaliphatic and/or aliphatic group and the two carboxyl groups capable of anhydride formation are in the 1,2-positions or 1,3-positions thereto, $R_1$ stands for a simple aliphatic group having 1 to 10 carbon atoms and A stands for a hydroxy or carboxyl group, with unsaturated and optionally in addition also saturated polybasic, carboxylic acids or their anhydrides and compounds containing hydroxyl groups. The olefinically unsaturated and saturated polybasic carboxylic acids and hydroxyl-containing compounds used may, for example, be the same as those mentioned above for the preparation of the unsaturated polyesters.

The unsaturated polyesters such as imide-containing unsaturated polyesters may generally also contain saturated and unsaturated oils, e.g. hydroxyfunctional oils such as castor oil or carboxy functional oils such as maleate oils. When compounds containing imide groups are used, it is. e.g. possible to use unsaturated oils for their preparation, in quantities from 5 to 50% by weight, based on the total weight of the polyester.

The unsaturated, radically polymerisable polyesters contain olefinically unsaturated, radically polymerisable monomers as reactive diluents.

The olefinically unsaturated monomers used may be of the type well known to the man of the art as radically photopolymerisable monomers; they may contain one or more olefinic double bonds as well as other functional groups. Acrylic and methacrylic acid esters and compounds having one or more vinylic or allylic double bonds are particularly suitable. Examples of monofunctional monomers are: Butyl (meth)-acrylate, hydroxyethyl (meth)acrylate, hydroxypropyl (meth)-acrylate and butanediol mono (meth)acrylate. Examples of difunctional monomers include butanediol di(meth)acrylate, hexanediol di(meth)acrylate and dipropylene glycol di(meth)acrylate. Examples of trifunctional and tetrafunctional monomers include trimethylolpropane tri(meth)-acrylate and pentaerythritol tri- or tetra-(meth)acrylate. The term (meth)acrylate is used here to denote acrylates and/or methacrylates.

Styrene and styrene derivatives such as divinylbenzene, p-methylstyrene and vinyl toluene are examples of vinylically unsaturated monomers. Diallyl phthalate and pentaerythritol tri- or tetra-allyl ethers are examples of allyl compounds.

Peroxide-free radical initiators such as photoinitiators and initiators which respond to heat may be added to the impregnating masses used according to the invention. Photoinitiators may be added when high energy radiation is used, especially when UV radiation is used.

The photoinitiators used may be of the type commonly used for compositions which can be cured by high energy radiation. For example, conventional initiators of this type which absorb in the wavelength region of from 190 to 400 nm may be used here as photoinitiators. Examples of such photoinitiators include chlorine-containing initiators such as chlorine-containing aromatic compounds described e.g. in U.S. Pat. No. 4,089,815; aromatic ketones as described in U.S. Pat. No. 4,318,791 or EP-A-0 003 002 and EP-A-0 161 463; hydroxyalkylphenones as described in U.S. Pat. No. 4,347,111; phosphine oxides as described in EP-A-0 007 086, 0 007 508 and 0 304 783; water-soluble initiators, for example those based on hydroxyalkylphenones as described in U.S. Pat. No. 4,602,097, unsaturated initiators such as OH-functional aromatic compounds esterified, for example, with acrylic acid as described in U.S. Pat. No. 3,929,490, EP-A-0 143 201 and EP-A-0 341 560; and combinations of such initiators as described, for example, in U.S. Pat. No. 4,017,652. 2-Methoxy-2-hydroxypropiophenone, benzophenone, thioxantone derivatives, acylphosphine oxides and Michlers ketone are preferred examples.

The photoinitiators mentioned above may be used singly or as mixtures; for example, combinations of phosphine oxides with other, conventional photoinitiators are preferred.

If the impregnating masses used according to the invention are subjected to partial or complete curing by heating, it is advantageous to add initiators which respond to heat. These may, if desired, be used together with photoinitiators.

C-C-Labile compounds such as those described in DE-PS-12 19 224 are examples of initiators which respond to heat. These are 1,2-substituted ethanes corresponding to the following general formula

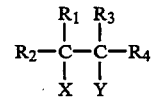

wherein $R_1$ and $R_3$ stand for aromatic groups, $R_2$ stands for a hydrogen atom or an aliphatic or aromatic group, $R_4$ stands for an aliphatic or aromatic group and X and Y stand for an optionally blocked hydroxyl group and/or halogen.

Other examples of 1,2-substituted ethanes suitable for use as intitiators for radical polymerisation with supply of heat are those corresponding to the following general formula

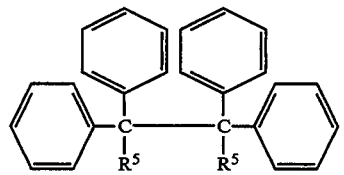

wherein $R^5$=OH, $OCH_3$, $OC_6H_5$, $CH_3$, CN, $NH_2$, Cl or $OSi(CH_3)_3$, as described, for example, by A. Bletzki and W. Krolikowski in Kunststoffe 70 (1980) 9, pages 558–562.

Further examples of heat activatable radical initiators based on 1,2-substituted ethanes are those corresponding to the following general formula:

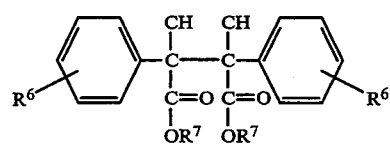

and

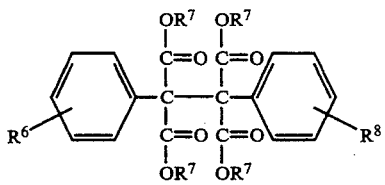

wherein the groups denoted by $R^6$ may consist, independently of one another, of hydrogen or one or more alkyl or alkoxy groups such as methyl or methoxy groups; and the groups denoted by $R^7$ may consist, independently of one another, of hydrogen atoms or alkyl groups, for example with 1 to 4 carbon atoms, such as methyl groups or ethyl groups. Compounds of this type have been described by, for example, H. Wolfers in Kunststoffe 68 (1978) 9, pages 553–555 and by D. Braun in Kunststoffe 69 (1979) 2, pages 100–104. These compounds are commercially available initiators. Another group of thermally activatable radical initiators are bifunctional initiators of the type of cyclic silylpinacol ethers as described, for example, in Polymer Bull. 16, 95 (1986).

The thermally activatable initiators may also be used as mixtures, as already described for the photoinitiators.

Unsaturated polyesters, used as binders in accordance with the invention contain one or more plastizising agents.

Plastizising agents can e.g. be usual plastizising agents for plastics as they are available on the market. However, it is also possible to use elastic polyesters which are not radically polymerisable. Further, radically polymerisable olefinically unsaturated polyesters (which are elastified) having a higher elasticity than the polyesters used in the impregnating mass can also be used.

Commercially available plastizisers are useful as usual plastizising agents, e.g. phthalates, such as diisodecyl phthalate; phosphates, such as triphenyl phosphate; fatty acid esters such as butyl oleate or butyl stearate; and polymeric plastizisers such as elastic polyesters, e.g. on the basis of adipic acid or sebacic acid with diols.

It is also possible to use radically polymerisable plastizisers, such as diallylphthalate or transesterification products of alkylphenol etheralcohols, such as nonylphenol polyethylenglycol derivatives with unsaturated carboxylic acids such as (meth)acrylic or their derivatives.

Plastizisers on the basis of olefinically unsaturated radically polymerisable elastified polyesters are e.g. such as defined for the polyesters used as binders. However, elastified means that the plastizisers have higher molecular weights than the polyesters which are used as binders. The number average molecular weight (Mn) of the polyesters which are used as binders are preferable 1000 to 3000, especially preferred 1200 to 2500. The number average molecular weight (Mn) of the unsaturated polyesters which are used as plastizisers is by 500 to 6000, especially preferred by 1500 to 6000 higher than that of the polyesters used as binders. The number average molecular weight (Mn) of the unsaturated polyesters which are used as plastizisers is preferable 1500 to 10000, especially preferred 3000 to 60000.

The different molecular weights of the polyesters used as binders and as plastizisers can be achieved by the choice of the corresponding starting monomers having different molecular weights, such as polyols and polycarbixylic acids.

Preferred examples for the unsaturated polyesters used as plastizisers are the imide containing ones such as they have been defined above as examples for binders.

It is also possible to introduce the unsaturated polyesters which are used as plastizisers into the unsaturated polyesters which are used as binders, during their preparation by condensation. In order to achieve this, the starting monomers of both polyesters can be mixed for reaction. This can be achieved e.g. by using different polyols and/or polycarboxylic acids.

The usual plastizisers are used e.g. in amounts of 1 to 20 wt.-% referring to the total impregnating mass. The unsaturated polyesters which are used as plastizisers are preferably used (also when incorporated by condensation) in an amount of 1 to 50 wt.-% referring to the sum to the polyesters used as binders and the polyesters used as plastizisers.

The impregnating masses used in accordance with the present invention can also contain further radically polymerisable binders together with the unsaturated polyesters which are used as binders in an amount up to 50 wt.-% of the polyester used as a binder. Examples for radically polymerisable binders are: Oligomers, prepolymers and polymers containing unsaturated double bonds, such as (meth)acrylic functional (meth)acrylic polymers, epoxide resin (meth) acrylates, e.g. reaction products of 2 mol of (meth)acrylic acid and commercial epoxide resins such as, for example, Epicote ® 828, polyester (meth)acrylates, polyether (meth)acrylates, urethane (meth)acrylates, amine (meth)acrylates, unsaturated polyurethanes, silicone (meth)acrylates and combinations thereof. Examples of such curable products are described in the following documents: Epoxy (meth) acrylates in EP-A-0 033 896, EP-A-0 049 922 and U.S. Pat. No. 4,485,123; urethane (meth)acrylates in EP-A-0 053 749, EP-A-0 209 684 and U.S. Pat. No. 4,162,274; polyester (meth) acrylates in EP-A-0 083 666, DE-A-38 10 140 and DE-A-38 20 294.

For the preparation of the radically polymerisable masses used according to the invention, the components mentioned above are mixed with the radical initiators. The usual additives such as pigments, extenders, accelerators (e.g. metal salts), and stabilizers (e.g. hydroquinone, benzoquinone) as known to the man of the art in this field may also be added to the radically polymerisable masses.

The materials which are to be impregnated according to the invention are impregnated with the impregnating mass to be used. This may be carried out by brush application from outside, by spraying or by immersion. Tubular materials or materials in the form of strands of wire, for example, may be impregnated by passing them through an impregnating bath so that they become impregnated from outside.

Impregnation is followed by curing of the radically polymerisable mass at least on the surface of the impregnated substrate, for example by means of a source of radiation emitting high energy radiation, e.g. a source of radiation of UV light or a source of electron radiation.

Conventional sources suitable for UV or electron radiation may be used as the sources of radiation. Mercury high pressure radiators and mercury medium pressure radiators, for example, are suitable sources of UV radiation.

For radiation curing, the impregnated fabric is moved past the surface of the source of radiation so that the process may be carried out continuously. The can be followed by curing by heat energy.

Curing by thermal energy may be carried out by means of the usual curing apparatus such as a heated oven or by IR radiation. The temperatures employed may be, for example, in the range of about 80° to 180° C. for reaction times which vary according to the system to be cured, for example from 1 minute to 180 minutes.

The process is generally carried out by subjecting masses of impregnating resin containing materials which are volatile at elevated temperatures to curing by high energy radiation the curing being as complete as possible. This applies particularly to materials containing low molecular weight volatile monomers such as styrene, divinylstyrene or vinyl toluene.

The substrates suitable for impregnation according to the invention are based on fibres and used for electrical purposes or as optical conductors; for example, substrates based on glass fibres, cotton fibres or synthetic resin fibres such as polyester fibres. These fibre materials may be present in various forms, for example as woven fabrics, braided fabrics, material in the form of lace or mesh, spun yarn or wound thread. So-called E-glass fibre is an example of a woven fabric. Such fabrics are frequently used in the form of tubes into which an electrically conductive material or optically conductive material such as glass fibres are drawn. Strands already containing an electrical or optical conductor coated with the fibre material may also be used. This fibre material may be a woven fabric or a braided fabric or it may be in the form of one or more coils. The electric conductor or optical conductor may also contain an intermediate protective layer, for example of silicone rubber. The fibre materials may thus be used for the protection or insulation of, for example, electric or optical conductors but they may also be in the form of cables and cords, for example for increasing the tensile strength in cable bundles.

The masses achieved in accordance with the invention are flexible.

Perfect impregnations are obtained by the procedure according to the invention. Emissions are thereby to a large extent avoided. The consumption of material for a given impregnation quality is thereby greatly reduced or improved quality of impregnation is obtained for a given consumption of material. The process may thus be carried out economically. The process of the invention avoids solvent emissions, which amount up to 80 wt.-% of the impregnating mass in known processes. The emission of monomers, amounting up to 20 wt.-% of the impregnating mass with known processes, is reduced to maximum about 5 wt.-%.

EXAMPLE 1

Preparation of an elastic unsaturated polyester usable as a plastiziser.
Recipe:

| | |
|---|---|
| 30 ppw | triethylene glycol (ppw = parts by weight) |
| 35 ppw | tetrahydrophtalic acid anhydride |
| 22 ppw | trimellitic acid anhydride |
| 21 ppw | ethanol amine |

The above-mentioned components are reacted in a reaction vessel by stirring under an inert gas in three hours at 126° to 160° C.

Then 11 ppw maleic acid anhydride and 25 ppw adipic acid are added and further reacted during 4 hours at 160° to 210° C. and the obtained water is continuously withdrawn.

The residual water is removed with 6 ppw xylene (seven hours at 190° to 200° C.). After distillation of the xylene in vacuum at 160° C., 0,5 ppw toluhydroquinone (stabilizer) are added and after cooling to about 100° C. 60 ppw styrene (reactive thinner) are added. A clear solution having a viscosity of 290 mPa.s (25° C.) is obtained.

EXAMPLE 2

Preparation of an unsaturated polyester used as a binder and having incorporated the unsaturated polyester plastiziser by condensation:

Example 1 is repeated, however, starting with the following components:

| | |
|---|---|
| 17 ppw | tetrahydrophthalic acid anhydride |
| 5 ppw | trimellitic acid anhydride |
| 12 ppw | triethylene glycol |
| 8 ppw | monethanol amine |
| 14 ppw | maleic anhydride |
| 6 ppw | adipic acid |
| 3 ppw | trimethylol propane |
| 6 ppw | neopentyl glycol |
| 0,2 ppw | toluhydroquinone (stabilizer) |
| 60 ppw | styrene (reactive thinner) |

In the same way as in Example 1 a clear solution is obtained.

EXAMPLE 3

Preparation of an impregnating mass.

The styrene solution of a mixture of a isophthalic acid polyester and an imide polyester (obtained in accordance with EP-A-O 134 513) is added with an unsaturated polyester as a plastiziser (in accordance with Example 1) and a photoinitiator in accordance with the following recipe:

| | |
|---|---|
| 50 ppw | imide polyester |
| 50 ppw | isophthalic acid polyester |
| 100 ppw | of the unsaturated polyester of Example 1 |
| 80 ppw | styrene |
| 0.05 ppw | hydroquinone (stabilizer) |
| 8 ppw | photoinitiator: 1-phenyl-1-hydroxypropiophenone |

A tube of glas fabric having an inner diameter of 8 mm is drawn with a velocity of 2 m/min through the above-mentioned impregnation mass in order to impregnate the outer surface. To achieve a uniform layer, the excess of the impregnation mass is removed with a dye having an appropriate form. The coated tube of fabric is passed by a source for UV-radiation (3 mercury medium pressure radiators, 100 W/cm) at the same velocity. A flexible uniformly coated impregnated tube of glas fabric is obtained.

EXAMPLE 4

The same recipe and the same procedure as in Example 3 is used. However, the recipe was added by 7 ppw of a heat-responding initiator, a phenylethane derivative according to DE-A-12 19 224. Thereby the passing velocity could be enhanced threefold, and after radiation curing a post curing treatment in a curing furnace was carried out at a temperature of 200° C.

EXAMPLE 5

Example 4 was repeated, however, no unsaturated polyester was added as a plastiziser. 20 ppw of a usual commercially available plastiziser for plastics, i.e. dimethylphthalate, were used. A flexible uniformly coated tube of glas fabric was achieved as in Example 4.

EXAMPLE 6

Recipe:

| | |
|---|---|
| 100 ppw | of the unsaturated polyester of Example 2 |
| 20 ppw | trimethylol propane triacrylate |
| 0.05 ppw | hydroquinone (stabilizer) |
| 2 ppw | photoninitiator as in Example 3 |
| 2 ppw | thermoresponding initiator of Example 4 |

The impregnating mass obtained from the above recipe was used as basis for impregnation of a tube of fabric as described in the above examples. Also here a uniformly coated flexible fabric tube was obtained.

What is claimed is:

1. A process for the production of flexible impregnated protective, auxiliary and insulating materials on a fiber basis for electrical purposes by the application of an impregnating agent to the material to be impregnated, followed by curing, characterized in that a solvent-free impregnating mass containing one or more olefinically unsaturated radically polymerized polyesters containing one or more polymerized monomers as reactive diluents, one or more plasticizing agents and optionally one or more peroxide-free radical initiators is applied to the material to be impregnated and curing is then carried out with UV-radiation and optionally by further heating.

2. A process according to claim 1, characterized in that the olefinically unsaturated polyester used is an imide-containing olefinically unsaturated polyester.

3. A process according to claim 1, characterized in that the impregnating mass used in one which contains at least one polymerized monomer, selected from the group consisting of vinyl compounds, (meth)acrylic compounds, and allyl compounds.

4. A process according to claim 2, characterized in that the impregnating mass used is one which contains at least one polymerized monomer, selected from the group consisting of vinyl compounds, (meth)acrylic compounds, and allyl compounds.

5. A process according to claims 1, 2, 3, or 4, characterized in that the radical initiators used are peroxide-free photoinitiators and curing is carried out with UV-radiation.

6. A process according to claims 1, 2, 3 or 4, characterized in that the radical initiators are activated thermally and curing is carried out by heating.

7. A process according to claims 1, 2, 3, or 4, characterized in that the radical initiators used are activated thermally or activated by UV-radiation or consist of mixtures of radical initiators which are activated by UV-radiation and radical initiators which are activated thermally by the supply of heat and in that curing is carried out by means of UV-radiation followed by heating.

8. A process for the production of impregnated protective and insulating materials on a fiber basis for electrical purposes by the application of an impregnating agent to the material to be impregnated, followed by curing, characterized in that a solvent-free impregnating mass of one or more olefinically unsaturated, radically polymerized polyesters, one or more plasticizing agents and optionally containing one or more heat activated peroxide-free radical initiators is applied to the material to be impregnated and curing is then carried out with electron radiation optionally followed by heating.

9. A process according to claims 1, 2, 3 or 4, characterized in that it is carried out with an impregnating mass additionally containing a binder selected from the group consisting of: acrylic and methacrylic unsaturated radically polymerized polyesters and oligomers in an amount of up to 50%, by weight of the unsaturated polyester.

10. A process according to claim 5, characterized in that it is carried out with an impregnating mass additionally containing a binder selected from the group consisting of: acrylic and methacrylic unsaturated radically polymerized polyesters and oligomers in an amount of up to 50%, by weight of the unsaturated polyester.

11. A process according to claim 6, characterized in that it is carried out with an impregnating mass additionally containing a binder selected from the group consisting of: acrylic and methacrylic unsaturated radically polymerized polyesters and oligomers in an amount of up to 50%, by weight of the unsaturated polyester.

12. A process according to claim 7, characterized in that it is carried out with an impregnating mass additionally containing a binder selected from the group consisting of: acrylic and methacrylic unsaturated radically polymerized polyesters and oligomers in an amount of up to 50%, by weight of the unsaturated polyester.

13. A process according to claim 8, characterized in that it is carried out with an impregnating mass additionally containing a binder selected from the group consisting of: acrylic and methacrylic unsaturated radically polymerized polyesters and oligomers in an amount of up to 50% by weight of the unsaturated polyester.

14. A process according to claims 1, 2, 3, or 4, characterized in that a commercially available plasticizer, an elastic polyester or an elastified olefinically unsaturated, radically polymerized polyester is used as a plasticizing agent.

15. A process according to claim 5, characterized in that a commercially available plasticizer, an elastic polyester or an elastified olefinically unsaturated, radically polymerized polyester is used as a plasticizing agent.

16. A process according to claim 6, characterized in that a commercially available plasticizer, an elastic polyester or an elastified olefinically unsaturated, radically polymerized polyester is used as a plasticizing agent.

17. A process according to claim 7, characterized in that a commercially available plasticizer, an elastic polyester or an elastified olefinically unsaturated, radically polymerized polyester is used as a plasticizing agent.

18. A process according to claim 8, characterized in that a commercially available plasticizer, an elastic polyester or an elastified olefinically unsaturated, radically polymerized polyester is used as a plasticizing agent.

19. A process according to claim 14, characterized in that diallylphthalate or transesterification products of alklyphenol etheralcohols are used as a plasticizer.

20. A process according to claims 15, 16, 17, or 18, characterized in that diallylphthlate or transesterification products of alkylphenol etheralcohols are used as a plasticizer.

21. A process according to claim 14, characterized in that one or more olefinically unsaturated, radically polymerized polyesters are used in which the elastified olefinically unsaturated, polymerized polyester serves as a plasticizer, is incorporated by condensation.

22. A process according to claims 15, 16, 17, or 18, characterized in that one or more olefinically unsaturated, radically polymerized polyesters are used in which the elastified olefinically unsaturated polymerized polyester serves as a plasticizer, is incorporated by condensation.

23. A process according to claim 14, characterized in that the polyester used as the elastified olefinically unsaturated polyester has an average molecular weight which is between 500 to 6,000 higher than that of the polyester in the impregnating mass.

24. A process according to claims 15, 16, 17, or 18, characterized in that the polyester used as the elastified olefinically unsaturated polyester has an average molecular weight (Mn) which is between 500 to 6,000 higher than that of the polyester in the impregnating mass.

25. A process according to claim 21, characterized in that the polyester used as the elastified olefinically unsaturated polyester has an average molecular weight (Mn) which is between 500 to 6,000 higher than that of the polyester in the impregnating mass.

26. A process according to claim 22, characterized in that the polyester used as the elastified olefinically unsaturated polyester has an average molecular weight (Mn) which is between 500 to 6,000 higher than that of the polyester in the impregnating mass.

27. A process for the production of flexible impregnated protective, auxiliary and insulating materials on a fiber basis for electrical purposes using solvent-free masses of one or more olefinically unsaturated, radically polymerized polyesters containing one or more polymerized monomers as reactive diluents, one or more plasticizing agents and optionally one or more peroxide-free radical initiators, as an impregnating material.

28. A process according to claim 27, characterized in that the process is used for the preparation of electrical conductors coated with fabrics.

* * * * *

UNITED STATES PATENT AND TRADEMARK OFFICE
CERTIFICATE OF CORRECTION

PATENT NO. : 5,405,657
DATED : April 11, 1995
INVENTOR(S) : Udo Bastian, et al.

It is certified that error appears in the above-identified patent and that said Letters Patent is hereby corrected as shown below:

On the title page: Item [54] and Column 1, line 1 "MASSAS" should be --MASSES--.

Item [75] Inventors, "Kiessling" should be --Kiebling--.

Column 1, line 6, "MASSAS" should be --MASSES--.

Column 1, line 12, "Of" should be --of--.

Column 1, line 47, "curing," should be --curing.--.

Column 2, line 18, "The" should be --They--.

Column 3, line 32, "bIe" should be --ble--.

Column 4, line 37, "R₄stands" should be --R₄ stands--.

Column 11, Claim 23, line 21, after "weight" insert --(Mn)--.

Signed and Sealed this

Eighteenth Day of July, 1995

Attest:

BRUCE LEHMAN

*Attesting Officer*          *Commissioner of Patents and Trademarks*